US006188872B1

United States Patent
Nagira et al.

(10) Patent No.: US 6,188,872 B1
(45) Date of Patent: Feb. 13, 2001

(54) METHOD OF CHECKING AND ACKNOWLEDGING RECEPTION OF DATA IN A TWO-WAY RADIO COMMUNICATION SYSTEM

(75) Inventors: Tumoru Nagira, Saitama; Kenzo Nakamura, Tokyo; Kenichiro Hosobuchi, Tokyo; Akira Shibuno, Tokyo, all of (JP)

(73) Assignee: Mitsubishi Materials Corporation, Tokyo (JP)

( * ) Notice: Under 35 U.S.C. 154(b), the term of this patent shall be extended for 0 days.

(21) Appl. No.: 09/165,092

(22) Filed: Oct. 2, 1998

(30) Foreign Application Priority Data

Oct. 3, 1997 (JP) ................................................. 9-271653
Sep. 2, 1998 (JP) ............................................... 10-248832

(51) Int. Cl.$^7$ ........................................................ H04B 7/15
(52) U.S. Cl. .......................... 455/11.1; 455/422; 455/445; 455/550; 370/338; 370/328; 370/349
(58) Field of Search ................................... 455/11.1, 422, 455/445, 450, 550, 575, 458; 370/328, 338, 349

(56) References Cited

U.S. PATENT DOCUMENTS

| 5,809,415 | 9/1998 | Rossmann . | |
|---|---|---|---|
| 5,838,252 | 11/1998 | Kikinis . | |
| 5,884,148 | * 3/1999 | Bilgic et al. | 455/74.1 |
| 5,956,331 | * 9/1999 | Rautiola et al. | 370/338 |
| 5,978,368 | * 11/1999 | Hjelm et al. | 370/347 |
| 5,978,650 | * 11/1999 | Fischer et al. | 455/3.1 |
| 5,983,072 | * 11/1999 | Schroderus | 455/11.1 |
| 6,108,314 | * 8/2000 | Jones et al. | 370/294 |

FOREIGN PATENT DOCUMENTS 61-208931  9/1986 (JP) .
3-38122    2/1991 (JP) .

* cited by examiner

Primary Examiner—Daniel S. Hunter
Assistant Examiner—Lana Le
(74) Attorney, Agent, or Firm—Oblon, Spivak, McClelland, Maier & Neustadt, P.C.

(57) ABSTRACT

A method of checking and acknowledging reception of a message in a two-way radio communication system without causing a reduction in the efficiency of processing the message, a storage medium on which a reception checking and acknowledging program is stored for use in the two-way radio communication system, and a two-way radio communication system and a base station for use in the two-way radio communication system is provided. If message data transmitted by a terminal device is received by a base station via a relay station and an Internet network, the base station generates reception acknowledgment data and transmits it in such a manner that when downstream message data is transmitted toward a plurality of terminal devices, the above-described reception acknowledgment data is added to the downstream message data and the resultant data is transmitted to the plurality of terminal devices.

31 Claims, 4 Drawing Sheets

METHOD OF CHECKING AND ACKNOWLEDGING RECEPTION OF DATA IN A TWO-WAY RADIO COMMUNICATION SYSTEM

BACKGROUND OF THE INVENTION

1. Field of the Invention

The present invention relates to a method of checking reception of a message and transmitting reception acknowledgment information associated with the received message in a two-way radio communication system in which a plurality of communication terminal devices transmit and receive information to and from each other, and also to a storage medium on which a reception acknowledgment transmission program is stored for use in such a two-way radio communication system. The present invention also relates to a two-way radio communication system and a base station for use in the two-way radio communication system.

2. Discussion of the Background

In most widely-used paging systems or similar systems, a large-zone downstream radio system is employed, in which a message is transmitted in only one direction from a caller's telephone to a recipient's receiving terminal device such as a pager unit. There is no practical two-way radio communication system that allows a caller and a recipient to send and receive a message to and from each other.

Recently, a paging system has been proposed in which a called device sends a message reception acknowledgment signal to a calling device. For example, in the technique disclosed in Japanese Unexamined Patent Publication No. 61-208931, when a user of a pager unit serving as a receiving terminal device receives a message from a caller, if the user of the pager unit presses a particular button of the pager unit, data indicating the status of the called pager is sent to the caller. Japanese Unexamined Patent Publication No. 3-38122 discloses a technique in which when a pager unit receives a calling signal, a beeping sound is generated to inform a called person (user of the pager unit) of arrival of a message and an acknowledgment signal is sent to a caller.

However, the conventional techniques of checking and acknowledging reception of a message are applicable only to a one-way radio communication system in which a message is sent in only one direction from a caller to a recipient, and the techniques cannot be typically employed in a two-way radio communication system in which a message is sent in both directions. Another problem of the conventional techniques of checking and acknowledging reception of a message is that when a base station receives a reception acknowledgment signal sent from a called device, the base station immediately transfers the received acknowledgment signal to a calling device and thus the base station often encounters congestion of various data, which brings about a reduction in processing efficiency in the transmission of messages to called devices.

SUMMARY OF THE INVENTION

In view of the above, an object of the present invention is to provide a method of checking and acknowledging reception of a message in a two-way radio communication system without causing a reduction in the efficiency of processing messages.

It is another object of the present invention is to provide a storage medium on which a reception checking and acknowledging program is stored for use in such a two-way radio communication system.

It is still another object of the present invention is to provide such a two-way radio communication system and a base station for use in the two-way radio communication system.

The above and other objects are achieved according to an aspect of the present invention, wherein there is provided a method of checking and acknowledging reception of information in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, wherein, in the process of transferring the information from the radio communication terminal device at the sending end to the radio communication terminal device at the destination, reception of the information originating from the radio communication terminal device at the sending end is checked and data indicating the result is sent to the radio communication terminal device at the sending end, and wherein the base station is adapted to operate in such a manner that when the base station correctly receives information sent from a radio communication terminal device at the sending end via the relay station and transmission line, the base station generates base station reception acknowledgment information indicating that the information has been correctly received; and when the base station transmits the information addressed to any of the plurality of radio communication terminal devices toward the plurality of radio communication terminal devices, the base station adds to the information the base station reception acknowledgment information addressed to the radio communication terminal device at the sending end and transmits the resultant information.

In the method of checking and acknowledging reception of information, the two-way radio communication system may include a plurality of transmission line communication terminal devices that are connected to the transmission line so that the transmission line communication terminal devices may transmit and receive information to and from the plurality of radio communication terminal devices via the base station, and the base station may be adapted to operate in such a manner that if the base station receives information that originates from any of the plurality of radio communication terminal devices and that is addressed to any of the plurality of transmission line communication terminal devices, the base station transmits the information via the transmission line to the transmission line communication terminal device designated as the destination of the information; if the base station correctly receives information that originates from a radio communication terminal device at a sending end via the relay station and transmission line and that is addressed to any of the plurality of radio communication terminal devices or any of the plurality of transmission line communication terminal devices, the base station generates base station reception acknowledgment information indicating that the information has been correctly received; and when the base station transmits the information addressed to any of the plurality of radio communication terminal devices toward the plurality of radio communication terminal devices, the base station adds to the information the base station reception acknowledgment information addressed to the radio communication terminal device at the sending end and transmits the resultant information.

In this method of checking and acknowledging reception of information, the plurality of radio communication terminal devices may be adapted to operate in such a manner that when any of the plurality of radio communication terminal device receives information addressed to that radio communication terminal device, the radio communication terminal device generates terminal device reception acknowledgment information addressed to a radio communication terminal device or a transmission line communication terminal device that is the original sender of the information, and transmits the terminal device reception acknowledgment information to the relay station; and the base station may be adapted to operate in such a manner that when the base station receives the terminal device reception acknowledgment information via the relay station and transmission line, if the terminal device reception acknowledgment information is addressed to any of the plurality of radio communication terminal devices, then the base station adds the terminal device reception acknowledgment information to the information when the base stations transmits the information addressed to the any of the plurality of radio communication terminal devices toward the plurality of radio communication terminal devices, however if the terminal device reception acknowledgment information is addressed to a transmission line communication terminal device, then the base station transmits the terminal device reception acknowledgment information via the transmission line to the transmission line communication terminal device that is the original sender of the information.

In this method of checking and acknowledging reception of information, the base station may be adapted to operate in such a manner that when the base station transmits information, that originates from any of the plurality of radio communication terminal devices and that is addressed to any of the radio communication terminal device or any of the transmission line communication terminal devices, to the plurality of radio communication terminal devices or transmission line communication terminal devices, the base station generates transmission acknowledgment information which will be sent to the radio communication terminal device that is the original sender of the information so as to inform that the information has been correctly transmitted from the base station; and when the base station transmits the information addressed to any of the plurality of radio communication terminal devices toward the plurality of radio communication terminal devices, the base station adds the transmission acknowledgment information to the information and transmits the resultant information.

In the method of checking and acknowledging reception of information, the base station may be adapted to operate in such a manner that the base station stores the information addressed to a radio communication terminal device or a transmission line communication terminal device, the terminal device reception acknowledgment information and base station reception acknowledgment information, and the transmission acknowledgment information, separately from each other, whenever such information is received; and when the base station transmits the stored information addressed to a radio communication terminal device, the base station adds at least one piece of stored terminal device reception acknowledgment information or one piece of base station reception acknowledgment information or one piece of transmission acknowledgment information to the information and transmits the resultant information.

According to another aspect of the invention, there is provided a two-way radio communication system including a base station that transmits information received via a transmission line, as a downstream signal; a plurality of radio communication terminal devices that receive information addressed to themselves via the downstream signal and that also transmit information generated by themselves as an upstream signal; and a plurality of relay stations that receive an upstream signal transmitted from the radio communication terminal devices and transmit the information included in the upstream signal to the base station via the transmission line, whereby the plurality of radio communication terminal devices transmit and receive information to and from one another via the base station and the relay station, the base station including base station reception acknowledgment information generating means adapted to operate in such a manner that when the base station correctly receives information originating from a radio communication terminal device via the relay station and transmission line, the base station reception acknowledgment information generating means generates base station reception acknowledgment information indicating that the information has been correctly received; and base station reception acknowledgment information adding means adapted to operate in such a manner that when the base station transmits the information addressed to any of the plurality of radio communication terminal devices toward the plurality of radio communication terminal devices, the base station reception acknowledgment information adding means adds to the information the base station reception acknowledgment information addressed to the radio communication terminal device that is the original sender of the information.

The two-way radio communication system may further comprise a plurality of transmission line communication terminal devices that are connected to the transmission line so that the transmission line communication terminal devices may transmit and receive information to and from the plurality of radio communication terminal devices via the transmission line and the base station, wherein the base station is adapted to operate in such a manner that transmission line transmitting means adapted to operate in such a manner that if the base station receives information that originates from any of the plurality of radio communication terminal devices and that is addressed to any of the plurality of transmission line communication terminal devices, the transmission line transmitting means transmits the information via the transmission line to the transmission line communication terminal device designated as the destination of the information, and wherein if the base station correctly receives information that originates from a radio communication terminal device at a sending end via the relay station and transmission line and that is addressed to any of the plurality of radio communication terminal devices or any of the plurality of transmission line communication terminal devices, the base station reception acknowledgment information generating means generates base station reception acknowledgment information indicating that the information has been correctly received.

In this two-way radio communication system, each of the plurality of radio communication terminal devices may comprise terminal device reception acknowledgment information generating means adapted to operate in such a manner that when any of the plurality of radio communication terminal device receives information addressed to that radio communication terminal device, the terminal device reception acknowledgment information generating means generates terminal device reception acknowledgment information addressed to a radio communication terminal device or a transmission line communication terminal device that is the original sender of the information; and upstream signal transmitting means for transmitting the terminal device reception acknowledgment information as an upstream signal, wherein the base station includes terminal device reception acknowledgment information adding means adapted to operate in such a manner that if the terminal device reception acknowledgment information received via the relay station and the transmission line is addressed to any of the plurality of radio communication terminal devices, the terminal device reception acknowledgment information adding means adds the terminal device reception acknowledgment information to the information when the information addressed to the any of the plurality of radio communication terminal devices is transmitted toward the plurality of radio communication terminal devices; and terminal device reception acknowledgment information transmitting means adapted to operate in such a manner that if the terminal device reception acknowledgment information is addressed to a transmission line communication terminal device, the terminal device reception acknowledgment information transmitting means transmits the terminal device reception acknowledgment information via the transmission line to the transmission line communication terminal device that is the original sender of the information.

In this two-way radio communication system, the base station may include transmission acknowledgment information generating means adapted to operate in such a manner that when the base station transmits information, that originates from any of the plurality of radio communication terminal devices and that is addressed to any of the radio communication terminal device or any of the transmission line communication terminal devices, to the plurality of radio communication terminal devices or transmission line communication terminal devices, the transmission acknowledgment information generating means generates transmission acknowledgment information that will be sent to the radio communication terminal device that is the original sender of the information so as to inform that the information has been correctly transmitted from the base station; and transmission acknowledgment information adding means adapted to operate in such a manner that when the base station transmits the information addressed to any of the plurality of radio communication terminal devices toward the plurality of radio communication terminal devices, the transmission acknowledgment information adding means adds the transmission acknowledgment information to the information addressed to the any of the plurality of radio communication terminal devices.

Furthermore, in this two-way radio communication system, the base station may include storage means for storing the information to be transmitted to the plurality of radio communication terminal device, the terminal device reception acknowledgment information and base station reception acknowledgment information, and the transmission acknowledgment information, separately from each other, whenever such information is received, wherein when the base station transmits, as a downstream signal, the information stored in the storage means to the plurality of radio communication terminal devices, the base station reception acknowledgment information adding means, terminal device reception acknowledgment information adding means, and transmission acknowledgment information adding means read at least one piece of terminal device reception acknowledgment information and one piece of base station reception acknowledgment information, and one piece of transmission acknowledgment information, from the storage means and add them to the information.

According to still another aspect of the invention, there is provided a two-way radio communication system comprising a base station that transmits information received via a transmission line, as a downstream signal; a plurality of radio communication terminal devices that receive information addressed to themselves via the downstream signal and that also transmit information generated by themselves as an upstream signal; and a plurality of relay stations that receive an upstream signal transmitted from the radio communication terminal devices and transmit the information included in the upstream signal to the base station via the transmission line, whereby the plurality of radio communication terminal devices transmit and receive information to and from one another via the base station and the relay station, the base station including a base station data processing unit adapted to operate in such a manner that when the base station correctly receives information originating from a radio communication terminal device via the relay station and transmission line, the base station data processing unit generates base station reception acknowledgment information indicating that the information has been correctly received; and a data adding unit adapted to operate in such a manner that when the base station transmits the information addressed to any of the plurality of radio communication terminal devices toward the plurality of radio communication terminal devices, the data adding unit adds to the information the base station reception acknowledgment information addressed to the radio communication terminal device from which the information originates.

The two-way radio communication system may further comprise a plurality of transmission line communication terminal devices that are connected to the transmission line so that the transmission line communication terminal devices may transmit and receive information to and from the plurality of radio communication terminal devices via the transmission line and the base station, wherein the base station includes a transmission line transmitter adapted to operate in such a manner that if the base station receives information that originates from any of the plurality of radio communication terminal devices and that is addressed to any of the plurality of transmission line communication terminal devices, then the transmission line transmitter transmits the information via the transmission line to the transmission line communication terminal device designated as the destination of the information, and wherein if the base station correctly receives information that originates from a radio communication terminal device at a sending end via the relay station and transmission line and that is addressed to any of the plurality of radio communication terminal devices or any of the plurality of transmission line communication terminal devices, the base station reception acknowledgment information generating means generates base station reception acknowledgment information indicating that the information has been correctly received.

In this two-way radio communication system, each of the plurality of radio communication terminal devices may comprise a terminal data generator adapted to in such a manner that when any of the plurality of radio communication terminal device receives information addressed to that radio communication terminal device, the terminal data generator generates terminal device reception acknowledgment information addressed to a radio communication terminal device or a transmission line communication terminal device that is the original sender of the information; and upstream signal transmitter for transmitting the terminal device reception acknowledgment information as an upstream signal, wherein the base station data processing unit of the base station is adapted to operate in such a manner that the base station data processing unit determines whether the terminal device reception acknowledgment information received via the relay station and the transmission line is addressed to a radio communication terminal device or a transmission line communication terminal device, and if the base station data processing unit determines that the terminal device reception acknowledgment information is addressed to a transmission line communication terminal device, the base station data processing unit transmits the terminal device reception acknowledgment information to the transmission line communication terminal device, however if the base station data processing unit determines that the terminal device reception acknowledgment information is addressed to a radio communication terminal device, when the information addressed to any of the plurality of radio communication terminal devices is transmitted toward the plurality of radio communication terminal devices, the base station data processing unit adds the terminal device reception acknowledgment information to the information.

Furthermore, in this two-way radio communication system, the base station data processing unit of the base station may be adapted to operate in such a manner that when the base station transmits information, that originates from any of the plurality of radio communication terminal devices and that is addressed to any of the radio communication terminal device or any of the transmission line communication terminal devices, to the plurality of radio communication terminal devices or transmission line communication terminal devices, the base station data processing unit generates transmission acknowledgment information that will be sent to the radio communication terminal device that is the original sender of the information so as to inform that the information has been correctly transmitted from the base station; and the data adding unit is adapted to operate in such a manner that when the base station transmits the information addressed to any of the plurality of radio communication terminal devices toward the plurality of radio communication terminal devices, the data adding unit adds the base station reception acknowledgment information to the information.

In this two-way radio communication system, the base station may include memories for storing the information to be transmitted to the plurality of radio communication terminal device, the terminal device reception acknowledgment information and base station reception acknowledgment information, and the transmission acknowledgment information, respectively, whenever such information is received, and the data adding unit may be adapted to operate in such a manner that when the base station transmits, as a downstream signal, the information stored in the memories to the plurality of radio communication terminal devices, the data adding unit reads at least one piece of terminal device reception acknowledgment information and one piece of base station reception acknowledgment information, and one piece of transmission acknowledgment information, from the memories and adds them to the information.

In any of the two-way radio communication systems described above, the Internet may be preferably employed as the transmission line.

According to another aspect of the present invention, there is provided a base station for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, the base station including base station reception acknowledgment information generating means adapted to operate in such a manner that when the base station correctly receives information originating from a radio communication terminal device via the relay station and transmission line, the base station reception acknowledgment information generating means generates base station reception acknowledgment information indicating that the information has been correctly received; base station reception acknowledgment information adding means adapted to operate in such a manner that when the base station transmits the information addressed to any of the plurality of radio communication terminal devices toward the plurality of radio communication terminal devices, the base station reception acknowledgment information adding means adds to the information the base station reception acknowledgment information addressed to the radio communication terminal device that is the original sender of the information; and transmission means for transmitting the information addressed to any of the plurality of radio communication terminal devices and the base station reception acknowledgment information added to the information toward the plurality of radio communication terminal devices.

The base station may further include transmission line transmitting means adapted to operate in such a manner that if the base station receives information that originates from any of the plurality of radio communication terminal devices and that is addressed to any of a plurality of transmission line communication terminal devices connected to the transmission line, the transmission line transmitting means transmits the information via the transmission line to the transmission line communication terminal device designated as the destination of the information, wherein if the base station correctly receives information that originates from a radio communication terminal device at a sending end via the relay station and transmission line and that is addressed to any of the plurality of radio communication terminal devices or any of the plurality of transmission line communication terminal devices, the base station reception acknowledgment information generating means generates base station reception acknowledgment information indicating that the information has been correctly received.

The base station may further include terminal device reception acknowledgment information adding means adapted to operate in such a manner that when the base station receives terminal device reception acknowledgment information from any of the plurality of radio communication terminal devices via the relay station and the transmission line, the terminal device reception acknowledgment information indicating that the radio communication terminal device has correctly received information, if the terminal device reception acknowledgment information is addressed to any of the plurality of radio communication terminal devices, the terminal device reception acknowledgment information adding means adds the terminal device reception acknowledgment information to information addressed to any of the plurality of radio communication terminal devices when the transmission means transmits the information addressed to the any of the plurality of radio communication terminal devices toward the plurality of radio communication terminal devices; and transmission line transmission controlling means adapted to operate in such a manner that when the terminal device reception acknowledgment information is addressed to a transmission line communication terminal device, the transmission line transmission controlling means controls the transmission line transmitting means to transmit the terminal device reception acknowledgment information to the transmission line communication terminal device that is the original sender of the information.

The base station may further include transmission acknowledgment information generating means adapted to operate in such a manner that when the transmission means or the transmission line transmitting means transmits information, that originates from any of the plurality of radio communication terminal devices and that is addressed to any of the radio communication terminal device or any of the transmission line communication terminal devices, to the plurality of radio communication terminal devices or transmission line communication terminal devices, the transmission acknowledgment information generating means generates transmission acknowledgment information that will be sent to the radio communication terminal device that is the original sender of the information so as to inform that the information has been correctly transmitted from the base station; and transmission acknowledgment information adding means adapted to operate in such a manner that when the base station transmits the information addressed to any of the plurality of radio communication terminal devices toward the plurality of radio communication terminal devices, the transmission acknowledgment information adding means adds the transmission acknowledgment information to the information addressed to the any of the plurality of radio communication terminal devices.

The base station may further include storage means for storing the information to be transmitted to the plurality of radio communication terminal device, the terminal device reception acknowledgment information and base station reception acknowledgment information, and the transmission acknowledgment information, separately from each other, whenever such information is received, wherein when the base station transmits the information stored in the storage means to the plurality of radio communication terminal devices, the base station reception acknowledgment information adding means, terminal device reception acknowledgment information adding means, and transmission acknowledgment information adding means read at least one piece of terminal device reception acknowledgment information and one piece of base station reception acknowledgment information, and one piece of transmission acknowledgment information from the storage means and add them to the information.

According to still another aspect of the present invention, there is provided a base station for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, the base station including a data processing unit adapted to operate in such a manner that when the base station correctly receives information originating from a radio communication terminal device via the relay station and transmission line, the data processing unit generates base station reception acknowledgment information indicating that the information has been correctly received; a data adding unit adapted to operate in such a manner that when the base station transmits the information addressed to any of the plurality of radio communication terminal devices toward the plurality of radio communication terminal devices, the data adding unit adds to the information the base station reception acknowledgment information addressed to the radio communication terminal device that is the original sender of the information; and a transmitter for transmitting the information addressed to any of the plurality of radio communication terminal devices and the base station reception acknowledgment information added to the information toward the plurality of radio communication terminal devices.

The base station may further include a transmission line transmitter adapted to operate in such a manner that if the base station receives information that originates from any of the plurality of radio communication terminal devices and that is addressed to any of a plurality of transmission line communication terminal devices connected to the transmission line, the transmission line transmitter transmits the information via the transmission line to the transmission line communication terminal device designated as the destination of the information, wherein if the base station correctly receives information that originates from a radio communication terminal device at a sending end via the relay station and transmission line and that is addressed to any of the plurality of radio communication terminal devices or any of the plurality of transmission line communication terminal devices, the base station reception acknowledgment information generating means generates base station reception acknowledgment information indicating that the information has been correctly received.

In this base station, the data processing unit may be adapted to operate in such a manner that when the base station receives terminal device reception acknowledgment information from any of the plurality of radio communication terminal devices via the relay station and the transmission line, the terminal device reception acknowledgment information indicating that the radio communication terminal device has correctly received information, the data processing unit determines whether the terminal device reception acknowledgment information is addressed to a radio communication terminal device or a transmission line communication terminal device, and if data processing unit determines that the terminal device reception acknowledgment information is addressed to a transmission line communication terminal device, the data processing unit outputs the terminal device reception acknowledgment information to the transmission line transmitter so that the transmission line transmitter transmits the terminal device reception acknowledgment information to the transmission line communication terminal device that is the original sender of the information, however if data processing unit determines that the terminal device reception acknowledgment information is addressed to a radio communication terminal device, when the information addressed to any of the plurality of radio communication terminal devices is transmitted toward the plurality of radio communication terminal devices, the data adding unit adds the terminal device reception acknowledgment information to the information.

In this base station, the data processing unit may also be adapted to operate in such a manner that when the transmitter or the transmission line transmitter transmits information, that originates from any of the plurality of radio communication terminal devices and that is addressed to any of the radio communication terminal device or any of the transmission line communication terminal devices, to the plurality of radio communication terminal devices or transmission line communication terminal devices, the base station generates transmission acknowledgment information which will be sent to the radio communication terminal device that is the original sender of the information so as to inform that the information has been correctly transmitted from the base station; and the data adding unit may be adapted to operate in such a manner that when the base station transmits the information addressed to any of the plurality of radio communication terminal devices toward the plurality of radio communication terminal devices, the data adding unit adds the base station reception acknowledgment information to the information.

The base station may further include memories for storing the information to be transmitted to the plurality of radio communication terminal device, the terminal device reception acknowledgment information and base station reception acknowledgment information, and the transmission acknowledgment information, respectively, whenever such information is received, wherein the data adding unit is adapted to operate in such a manner that when the base station transmits the information stored in the memories to the plurality of radio communication terminal devices, the data adding unit reads at least one piece of terminal device reception acknowledgment information and one piece of base station reception acknowledgment information, and one piece of transmission acknowledgment information, from respective the memories and adds them to the information.

According to still another aspect of the present invention, there is provided a computer-readable storage medium on which reception checking and acknowledging program is stored, for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, wherein, in the process of transferring the information from the radio communication terminal device at the sending end to the radio communication terminal device at the destination, the reception checking and acknowledging program checks whether the information originating from the radio communication terminal device at the sending end has been correctly received and transmits data indicating the result to the radio communication terminal device at the sending end, the reception checking and acknowledging program comprising a first step in which when the base station correctly receives information sent from a radio communication terminal device at the sending end via the relay station and transmission line, base station reception acknowledgment information indicating that the information has been correctly received is generated in the base station; and a second step in which when the information addressed to any of the plurality of radio communication terminal devices is transmitted from the base station toward the plurality of radio communication terminal devices, the base station reception acknowledgment information addressed to the radio communication terminal device at the sending end is added to the information and the resultant information is transmitted.

In this computer-readable storage medium, the two-way radio communication system may include a plurality of transmission line communication terminal devices that are connected to the transmission line so that the transmission line communication terminal devices may transmit and receive information to and from the plurality of radio communication terminal devices via the base station, the reception checking and acknowledging program further comprising a third step in which if information that originates from any of the plurality of radio communication terminal devices and that is addressed to any of the plurality of transmission line communication terminal devices is received by the base station, the information is transmitted via the transmission line to the transmission line communication terminal device designated as the destination of the information; a fourth step in which if information that originates from a radio communication terminal device at a sending end via the relay station and transmission line and that is addressed to any of the plurality of radio communication terminal devices or any of the plurality of transmission line communication terminal devices is correctly received by the base station, base station reception acknowledgment information indicating that the information has been correctly received is generated, and a fifth step in which when the information addressed to any of the plurality of radio communication terminal devices is transmitted from the base station toward the plurality of radio communication terminal devices, the base station reception acknowledgment information addressed to the radio communication terminal device at the sending end is added to the information and the resultant information is transmitted.

In this computer-readable storage medium, the reception checking and acknowledge ledging program may further comprise a sixth step in which when terminal device reception acknowledgment information is received from any of the plurality of radio communication terminal devices via the relay station and the transmission line, the terminal device reception acknowledgment information indicating that the radio communication terminal device has correctly received information, if the terminal device reception acknowledgment information is addressed to any of the plurality of radio communication terminal devices, when the information addressed to the any of the plurality of radio communication terminal devices is transmitted from the base station toward the plurality of radio communication terminal devices, the terminal device reception acknowledgment information is added to the information and the resultant information is transmitted; and a seventh step in which if the terminal device reception acknowledgment information is addressed to a transmission line communication terminal device, the terminal device reception acknowledgment information is transmitted via the transmission line to the transmission line communication terminal device that is the original sender of the information.

In the computer-readable storage medium, the reception checking and acknowledging program may further comprise an eighth step in which when information that originates from any of the plurality of radio communication terminal devices and that is addressed to any of the radio communication terminal device or any of the transmission line communication terminal devices is transmitted from the base station to the plurality of radio communication terminal devices or transmission line communication terminal devices, transmission acknowledgment information is generated which will be sent to the radio communication terminal device that is the original sender of the information so as to inform that the information has been correctly transmitted from the base station; and a ninth step in which when the information addressed to any of the plurality of radio communication terminal devices is transmitted toward the plurality of radio communication terminal devices, the transmission acknowledgment information is added to the information and the resultant information is transmitted.

In the computer-readable storage medium, the reception checking and acknowledging program may further comprise a tenth step in which the information addressed to a radio communication terminal device or a transmission line communication terminal device, the terminal device reception acknowledgment information and base station reception acknowledgment information, and the transmission acknowledgment information are stored separately from each other whenever such information is received by the base station; and an eleventh step in which when the stored information addressed to a radio communication terminal device is transmitted from the base station, at least one piece of stored terminal device reception acknowledgment information or one piece of base station reception acknowledgment information or one piece of transmission acknowledgment information is added to the information and the resultant information is transmitted.

BRIEF DESCRIPTION OF THE DRAWINGS

A more complete appreciation of the invention and many of its attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
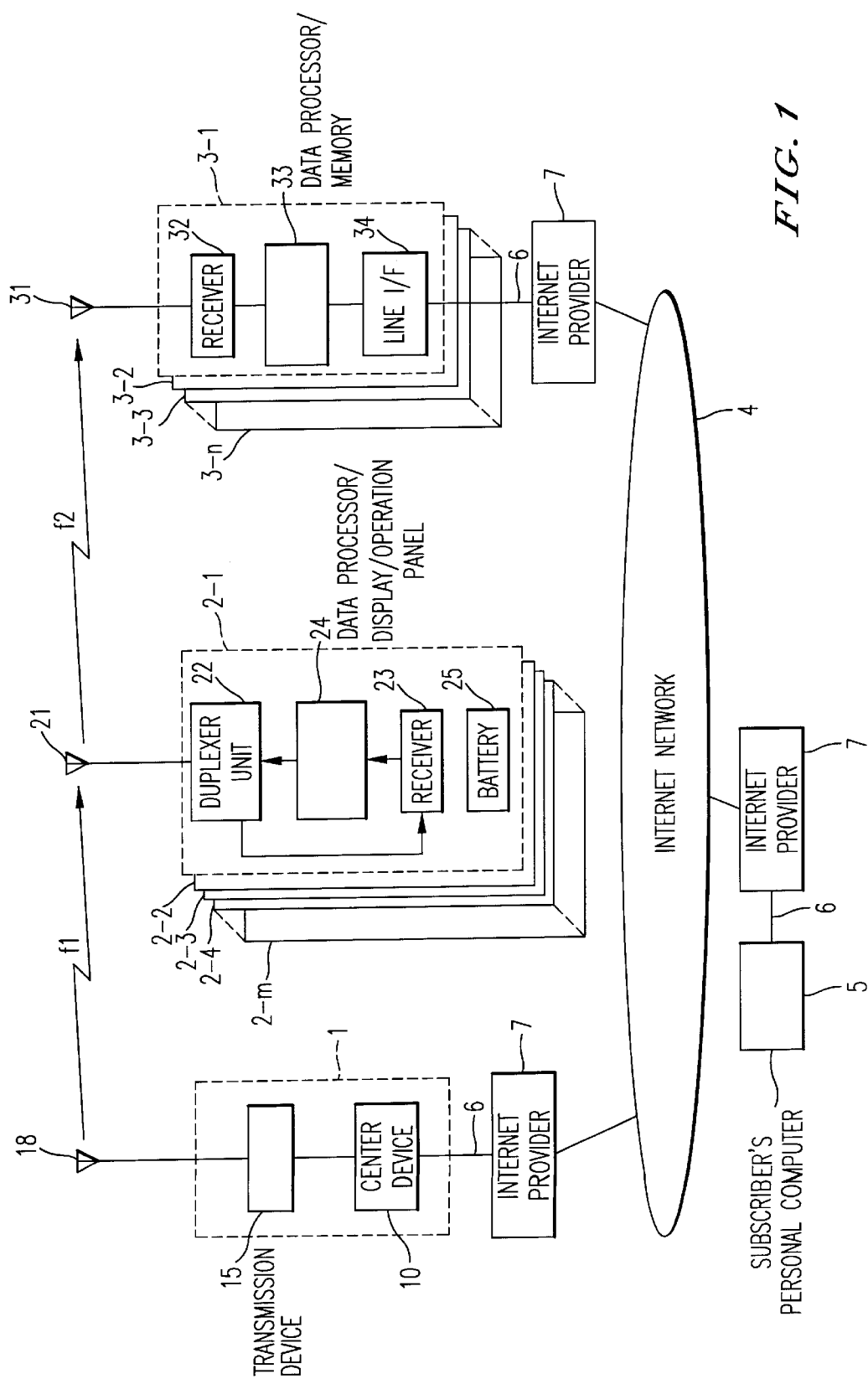
FIG. 1 is a block diagram illustrating a two-way radio communication system using a method of checking and acknowledging reception data according to an embodiment of the present invention.

Referring now to the drawings, wherein the like reference numerals designate identical or corresponding parts throughout the several views, and more particularly to FIG. 1 thereof, there is illustrated a block diagram of a two-way radio communication system using a method of checking and acknowledging reception data according to the present invention.

As shown in FIG. 1, this two-way radio communication system includes a base station 1, terminal devices 2-1 to 2-m, relay stations 3-1 to 3-n, an Internet network 4, and a personal computer 5 of a subscriber of the two-way radio communication system (hereinafter referred to simply as a subscriber's personal computer).

The base station 1 receives message data from the subscriber's personal computer 5 via the Internet network 4, and transmits the received message data as a downstream signal over a large zone (with a radius of about 30 km). The large zone includes a plurality of small zones (each having a radius of 3 km to 5 km) which will be described later. The base station 1 also receives message data transmitted by terminal devices 2-1 to 2-m via the relay stations 3-1 to 3-n, and transmits the received message data to a terminal device 2 or the subscriber's personal computer depending on the destination of the message data.

The terminal devices 2-1 to 2-m receive a large-zone downstream signal transmitted by the base station 1, and also transmit message data created by themselves as a small-zone upstream signal to a relay station 3 installed in a small zone in which a terminal device is currently located.

Figure 2:
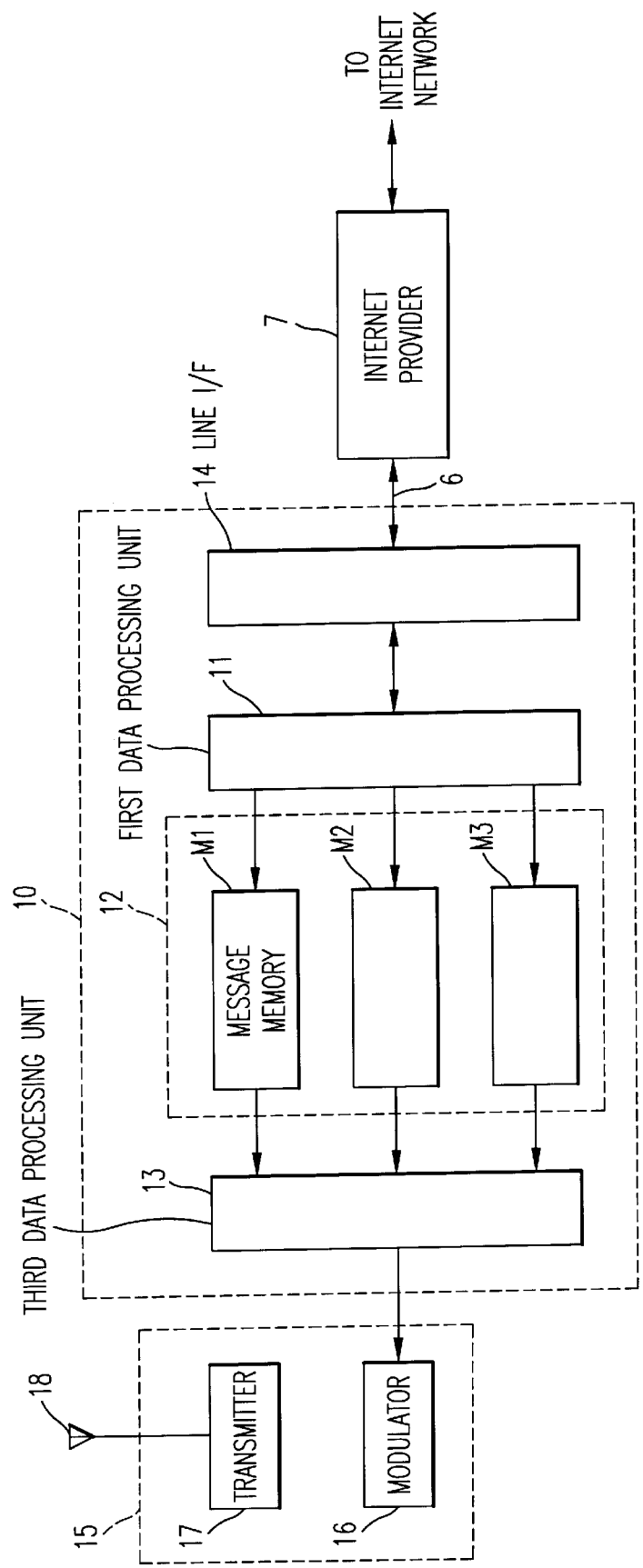
FIG. 2 is a block diagram illustrating the details of the base station in the two-way radio communication system.

One relay station 3 is installed in each small zone and receives a small-zone upstream signal transmitted by a terminal device 2. The subscriber's personal computer 5 transmits and receivers message data to and from terminal devices 2-1 to 2-m via the Internet network 4 and via the base station 1. Although only one subscriber's personal computer 5 is shown in FIG. 2 for the sake of simplicity, the actual system includes a plurality of similar personal computers.

The base station 1, the relay stations 3-1 to 3-n, and the subscriber's personal computer are connected to the Internet network 4 via cable lines 6 and Internet providers 7. The relay stations 3-1 to 3-n transmits message data included in a received small-zone upstream signal to the base station 1 via the Internet network 4. The subscriber's personal computer 5 transmits message data issued by a subscriber to the base station 1 via the Internet network 4.

The base station 1 includes a center device 10 for processing data received via the Internet network 4 and a transmission device 15 for transmitting the data processed by the center device 10 as a large-zone downstream signal.

The terminal devices 2-1 to 2-m each include an antenna 21, a duplexer unit 22, a receiver 23, and a data processor/display/operating panel 24. There is also provided a battery 25 for supplying electric power to the respective elements described above. The duplexer unit 22 receives the large-zone downstream signal transmitted from the base station 1 via the antenna 21, and outputs the received signal to the receiver 23. The duplexer unit 22 also modulates a carrier wave (with a frequency of f2) in accordance with the upstream transmission signal (which will be described later) output by the data processor/display/operating panel 24, and transmits the resultant wave as a small-zone upstream signal based on the CSMA/CD (Carrier Sense Multiple Access/Collision Detection) technique to the relay station 3. The receiver 23 demodulates the large-zone downstream signal received from the duplexer unit 22 and outputs the obtained downstream transmission data transmitted from the base station 1 to the data processor/display/operating panel 24.

The data processor/display/operating panel 24 includes a display device (such as a liquid crystal display panel) for displaying character data and other information, a memory for storing reception acknowledgment data (terminal device reception acknowledgment information) indicating that a message from the base station has been correctly received, and various operating buttons (such as character input keys, reception acknowledgment button) for inputting a message to be transmitted to the subscriber's personal computer 5 or some terminal device and also for issuing a transmission start command. If the downstream transmission data output by the receiver 23 includes message data addressed to the terminal device itself and reception acknowledgment data or transmission acknowledgment data, the data processor/display/operating panel 24 displays the data on the display device. When a user inputs a message via the operating buttons and issues a transmission start command or presses the reception acknowledgment button, the data processor/display/operating panel 24 adds a header and error correction data to the message or the reception acknowledgment data and outputs the resultant data to the duplexer unit 22.

The relay stations 3-1 to 3-n each include an antenna 31, a receiver 32, a data processor/memory 33, and a line interface unit 34. The receiver 32 demodulates a small-zone upstream signal received from a terminal device 2 via the antenna 31 into the data format shown in FIG. 4, and outputs the resultant data. The data processor/memory 33 stores the data received from the receiver 32 in the same order in which the data is received. When the amount of the stored data reaches a predetermined value, the data is compressed and is output together with a TCP header and an IP header to the line interface unit 34.

The base station 1 is described in further detail below with reference to FIG. 2. In FIG. 2, the center device 10 includes a first data processing unit 11, a second data processing unit 12, a third data processing unit 13, and a line interface unit 14 for connecting the first data processing unit 11 to an Internet provider 7.

The transmission device 15 includes, as shown in FIG. 2, a modulator 16, a transmitter 17, and an antenna 18. The modulator 16 modulates a carrier wave (with a frequency of f1) in accordance with the downstream transmission data output by the third data processing unit 13. The modulator 16 may perform the modulation process according to a linear modulation technique such as n/4-shift QPSK (Quadrature Phase Shift Keying) modulation or multilevel QAM (Quadrature Amplitude Modulation). The transmitter 17 amplifies the carrier wave modulated by the modulator 16 and radiates the modulated carrier wave as a large-zone downstream signal from the antenna 18.

If the first data processing unit 11 receives message data transmitted by a relay station 3 or the subscriber's personal computer 5, the first data processing unit 11 adds a header including information associated with the sender address and the destination address to the received message data, and outputs the resultant data as downstream message data to the second data processing unit 12 or the line interface unit 14. The first data processing unit 11 also generates and outputs various acknowledgment data as described below.

1. When the first data processing unit 11 receives message data transmitted from some of terminal devices 2-1 to 2-m, the first data processing unit 11 generates reception acknowledgment data (base station reception acknowledgment information) to be transmitted to the terminal device that is the original sender of the message data, and outputs the resultant reception acknowledgment data to the second data processing unit 12.

2. When message data that originates from some of terminal devices 2-1 to 2-m and that is addressed to the subscriber's personal computer 5 is transferred to the subscriber's personal computer 5, the first data processing unit 11 generates transmission acknowledgment data (transmission acknowledgment information) to be transmitted to the terminal device 2 that is the original sender of the message data, and outputs the resultant transmission acknowledgment data to the second data processing unit 12.

3. When message data that originates from the subscriber's personal computer 5 and that is addressed to some of terminal devices 2-1 to 2-m is transferred to the terminal device, the first data processing unit 11 generates transmission acknowledgment data to be transmitted to the subscriber's personal computer, and outputs the resultant transmission acknowledgment data to the line interface unit 14.

The reception acknowledgment data and the transmission acknowledgment data each include a header including information about the destination address designating the destination to which the acknowledgment data should be transmitted, a message indicating that the message data has been correctly received or transmitted, and data for correcting an error in the information or the message (as will be described in further detail later).

The second data processing unit 12 includes a message memory M1 for storing the downstream message data received from the first data processing unit 11, a reception acknowledgment memory M2 for storing the reception acknowledgment data, and a transmission acknowledgment memory M3 for storing the transmission acknowledgment data.

The third data processing unit 13 reads downstream message data from the message memory M1 in the second data processing unit 12 in the same order in which the data was stored. The third data processing unit 13 adds a plurality of reception acknowledgment data and transmission acknowledgment data read from the reception acknowledgment memory M2 and the transmission acknowledgment memory M3, respectively, to the downstream message data, and outputs the resultant data to the transmission device 15.

Figure 3A:
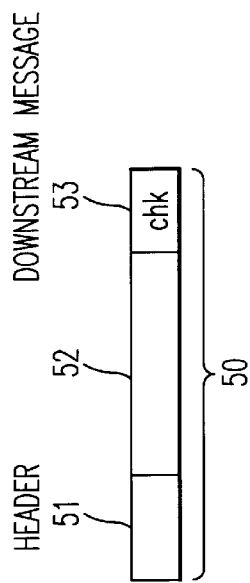
FIG. 3 is a schematic representation of formats of various data transmitted from the base station in the two-way radio communication system.

The format of the downstream transmission data is described below with reference to FIG. 3. In FIG. 3a, reference numeral 50 denotes the format of the downstream message data stored in the message memory M1 of the second data processing unit 12. Reference numeral 51 denotes a header 51 including information about the destination address, the sender address, and the length of the message data to be sent. Reference numeral 52 denotes message data transmitted from some terminal device 2 or the subscriber's personal computer 5. Reference numeral 53 denotes error correction data check used to detect an error in the downstream message data 50 and correct the error.

Figure 3B:
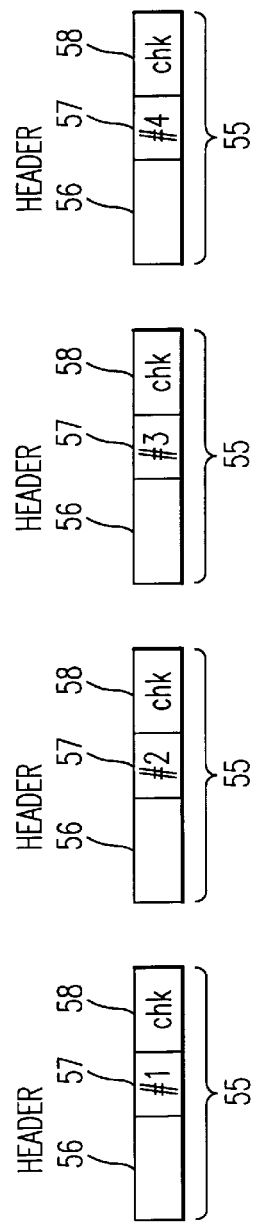

In FIG. 3b, reference numeral 55 denotes the format of the reception acknowledgment data and the transmission acknowledgment data stored in the reception acknowledgment memory M2 and the transmission acknowledgment memory M3, respectively, of the second data processing unit 12. The reception acknowledgment data stored in the reception acknowledgment memory M2 may be generated by the base station 1 or by some terminal device 2 (as will be described in further detail later).

In FIG. 3b, a header 56 includes information about the destination address, the sender address, and the length of the reception acknowledgment data or the transmission acknowledgment data to be sent. Reference numeral 57 denotes the reception acknowledgment data or the transmission acknowledgment data. Reference numeral 58 denotes error correction data check used to detect an error in the reception acknowledgment data or the transmission acknowledgment data and correct the error.

Figure 3C:
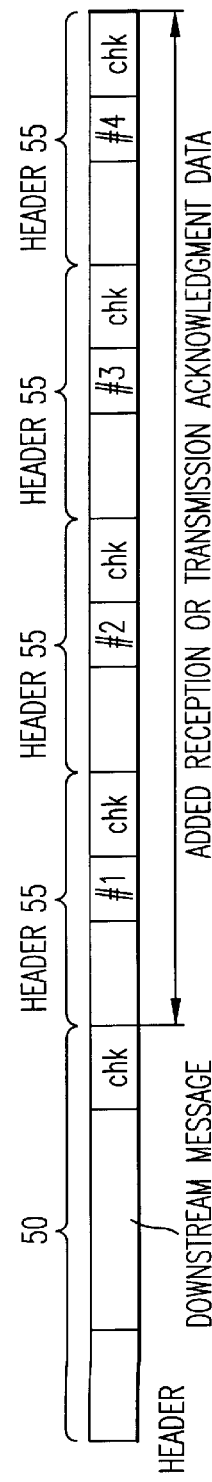

When the third data processing unit 13 reads the downstream message data from the message memory M1, it checks whether reception acknowledgment data and transmission acknowledgment data are stored in the reception acknowledgment memory M2 and transmission acknowledgment memory M3, respectively. If there is such data in the memories, the third data processing unit 13 reads a predetermined number of acknowledgment data 55 (four acknowledgment data 55 in this specific example) from the reception acknowledgment memory M2 and transmission acknowledgment memory M3 in 10 the same order in which the data was stored, and adds the obtained data to the above-described downstream message data 50 as shown in FIG. 3c.

The number of acknowledgment data read from reception acknowledgment memory M2 and transmission acknowledgment memory M3, respectively, is predetermined properly. In the example shown in FIG. 3c, the same number of reception acknowledgment data and transmission acknowledgment data (that is, two reception acknowledgment data and two transmission acknowledgment data) may be added to the downstream message data, or for example three reception acknowledgment data and one transmission acknowledgment data may be read and added to the downstream message data.

Figure 4:
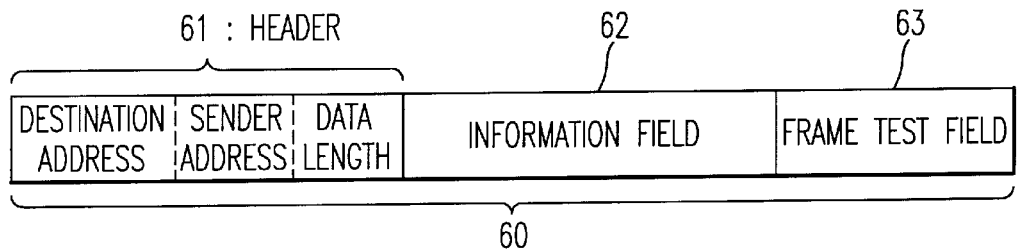
FIG. 4 is a schematic representation of the format of upstream transmission data transmitted from a terminal device in the two-way radio communication system.

FIG. 4 illustrates the format of the upstream transmission data. As shown in FIG. 4, the upstream transmission data 60 includes a header 61, an information field 62, and a frame test field 63. The header 61 includes information about the destination address, the sender address, and the length of the message data to be transmitted. The information field 62 includes the message data or the reception acknowledgment data to be transmitted. The frame test field 63 includes data used to detect an error in the contents of the upstream transmission data 60 and correct the error to a certain degree. The format of the reception acknowledgment data and the transmission acknowledgment data shown in FIG. 3b is similar to the above-described format of the upstream transmission data.

Figure 5A:
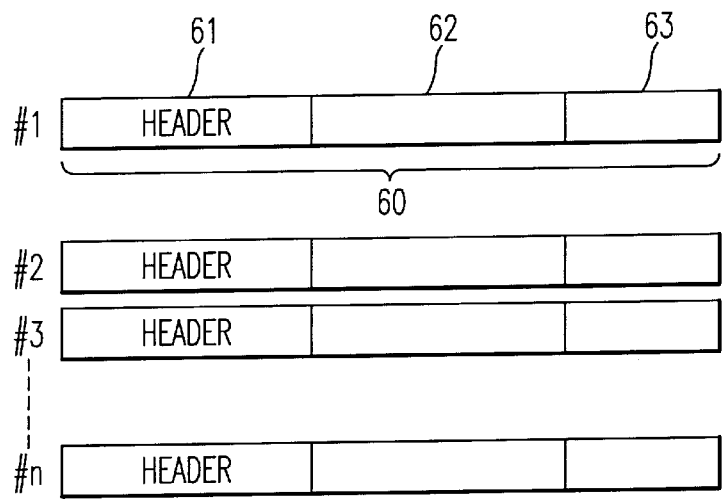
FIG. 5 is a schematic re presentation of the format of compressed upstream data transmitted from a relay station in the two-way radio communication system.
Figure 5B:
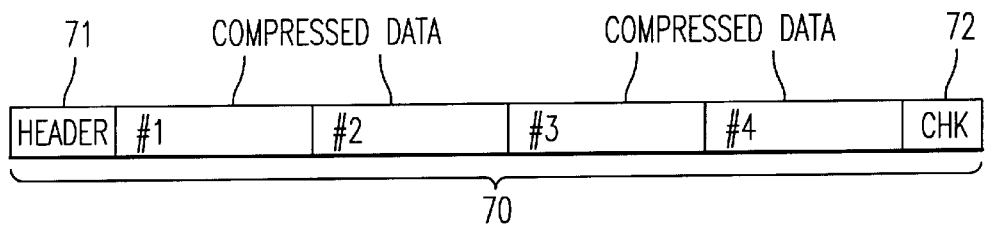

Referring now to FIG. 5, the data compressed by the data processor/memory 33 is described in further detail. When n (n≧4) upstream transmission data 60 are held in the data processor/memory 33 after being demodulated by the receiver 32 (refer to FIG. 5a), four upstream transmission data 60 are read and compressed. A TCP/IP header 71 and check data 72 used to check an error in the compressed data are added to the compressed data. The resultant data is then output as an upstream compressed data 70 to the line interface unit 34 (refer to FIG. 5b). The line interface unit 34 transmits the received compressed data 70 to the base station 1 via the cable line 6 and the Internet provider 7.

The data transmission/reception operation in the two-way radio communication system is described in further detail below regarding (1) the operation of transmitting a message from a subscriber to a terminal device; (2) the operation of transmitting a message from a certain terminal device to another terminal device; and (3) the operation of transmitting a message from a terminal device to a subscriber (refer to FIGS. 1–5).

1. Transmission Of A Message from A Subscriber To A Terminal Device

First, the operation of transmitting a message from the subscriber's personal computer to the terminal device 2-1 is described. If the subscriber operates his/her personal computer 5 so as to issue a command to transmit a message to the user of the terminal device 2-1, a TCP/IP header is added to the message to be transmitted and the resultant data is transmitted to the base station 1. The base station 1 receives this message via the Internet network 4. In the base station 1, the received message data is applied to the first data processing unit 11 via the line interface unit 14 of the center device 10. The first data processing unit 11 performs an error detection/correction process on the received data.

After the error detection/correction process, the first data processing unit 11 detects the destination address and the sender address included in the TCP/IP header of the received data. In this specific example, the first data processing unit 11 detects that the sender is the subscriber's personal computer 5 and the destination is the terminal device 2-1. The first data processing unit 11 adds the destination address (the address of the terminal device 2-1) and the sender address (the address of the subscriber's personal computer 5) to the received message data. The first data processing unit 11 further adds an error detection/correction data to the above data, and outputs the resultant data as downstream message data to the second data processing unit 12. The second data processing unit 12 stored the downstream message data into the message memory M1.

The third data processing unit 13 reads the downstream message data from the message memory M1 in the same order in which the data was stored. In the case where the reception acknowledgment memory M2 and the transmission acknowledgment memory M3 includes reception acknowledgment data and transmission acknowledgment data, respectively, the third data processing unit 13 reads a predetermined number of reception acknowledgment data and transmission acknowledgment data in the same order in which the data were stored. These data are added to the downstream message data, and the resultant data is outputs as a downstream transmission data to the transmission device 15.

In the transmission device 15, the modulator 16 modulates the downstream transmission data received from the center device 10. The resultant data is then transmitted as a large-zone downstream signal from the transmitter 17 via the antenna 18 toward the terminal devices 2-1 to 2-m. At the same time, the first data processing unit 11 transmits a transmission acknowledgment message to the subscriber's personal computer 5 via the Internet network 4. In response, a message informing the subscriber that the message addressed to the terminal device 2-1 has been correctly transferred from the base station 1 is displayed on the monitor of the subscriber's personal computer 5.

If the receiver 23 receives the large-zone downstream signal transmitted by the base station 1, via the antenna 21 and the duplexer unit 22 of the terminal device 2-1, the receiver 23 demodulates the received signal and supplies the demodulated signal to the data processor/display/operating panel 24. The data processor/display/operating panel 24 performs an error detection/correction process on the received data and displays the message from the subscriber's personal computer 5 on the display device.

After the user of the terminal device 2-1 reads this message, if the user presses the reception acknowledgment button of the data processor/display/operating panel 24 thereby sending a reception acknowledgment data to the subscriber's personal computer, the data processor/display/operating panel 24 puts the reception acknowledgment data stored in the memory into the information field 62 shown in FIG. 4 and adds a header 61 (destination address=address of the subscriber's personal computer, sender address=address of the terminal device 2-1) and a frame test field 63. The resultant data is output as an upstream transmission data 60 to the duplexer unit 22. The duplexer unit 22 modulates the received upstream transmission data and transmits via the antenna 21 the resultant data as a small-zone upstream signal according to the CSMA/CD technique to the relay station 3.

If the relay station 3 receives the small-zone upstream signal transmitted by the terminal device 2-1, the receiver 32 demodulates the received signal into the upstream transmission data 60 and outputs the resultant data to the data processor/memory unit 33. The data processor/memory unit 33 performs an error detection/correction process on the upstream transmission data 60 and stores the resultant data into the memory. When the amount of the upstream transmission data 60 stored in the memory of the data processor/memory unit 33 reaches a predetermined value, a predetermined number of upstream transmission data are compressed, and a header 71 and a check data 72 shown in FIG. 5 are added. The resultant data is then transmitted to the base station 1 via the line interface unit 34, the cable line 6, and the Internet provider 7.

If the base station 1 receives the compressed data 70 shown in FIG. 5, the first data processing unit 11 decompresses the data and performs an error detection/correction process on the data. If there is duplicated data, it is removed. The duplication of data occurs, for example, when a small-zone upstream signal transmitted from a certain terminal device is received by a plurality of relay stations, and thus the same upstream transmission data is transmitted from the respective relay stations to the base station 1.

After completion of the above process, the first data processing unit 11 detects the destination address and the sender address described in the header 50 attached to each data. In this specific case, the address of the subscriber's personal computer 5 is designated as the destination address of the reception acknowledgment data transmitted from the terminal device 2-1, and thus the first data processing unit 11 outputs the received reception acknowledgment data to the subscriber's personal computer 5 via the line interface unit 14 and the Internet network 4. If the subscriber's personal computer 5 receives the reception acknowledgment data, a message informing the subscriber that the message addressed to the terminal device 2-1 has been acknowledged by the user of the terminal device is displayed on the monitor of the subscriber's personal computer 5.

As described above, in the case where a message addressed to the user of a terminal device is sent from a subscriber, when the message is transferred from the base station 1 to the terminal device 2, a transmission acknowledgment message is displayed on the monitor of the subscriber's personal computer 5. Furthermore, when the user of the terminal device 2 acknowledges the message, reception acknowledgment data is displayed on the monitor of the subscriber's personal computer 5.

2. Transmission of a Message from a Terminal Device to Another Terminal Device

The operation of transmitting a message from a certain terminal device to another terminal device is described below. If the user of the terminal device 2-1 inputs a message addressed to the terminal device 2-2 via the data processor/display/operating panel 24 and issues a transmission start command, then the data processor/display/operating panel 24 puts the input message data into the information field 62 of upstream transmission data 60. Furthermore, the data processor/display/operating panel 24 puts data designating the address of the terminal device 2-2 as the destination address into the header field 61 (refer to FIG. 4) and also puts error detection/correction data into the frame test field 63. The resultant data is transmitted via the duplexer unit 22 and the antenna 21 to the relay station 3.

When relay station 3 receives the small-zone upstream signal transmitted from the terminal device 2-1, the receiver 32 demodulates the received signal and the data processor/memory unit 33 performs an error detection/correction process on the demodulated signal. The resultant data is stored in the memory. When the amount of the upstream transmission data stored in the memory of the data processor/memory unit 33 reaches a predetermined value, a predetermined number of upstream transmission data are compressed, and a header 55 and check data 56 shown in FIG. 5 are added. The resultant data is then transmitted to the base station 1.

If the base station 1 receives the data, shown in FIG. 5, from the relay station 3, the first data processing unit 11 decompresses the data and performs an error detection/correction process on the data. If there is duplicated data, it is removed. After completion of the above process, the first data processing unit 11 detects the destination address and the sender address included in the TCP/IP header of the received data.

In this specific example, the terminal device 2-2 is designated as the destination of the upstream transmission data transmitted from the terminal device 2-1, and thus the first data processing unit 11 adds a header 51 describing that the destination is the terminal device 2-2 and the sender is the terminal device 2-1 and also error detection/correction data 53 to the message data from the terminal device 2-1. The resultant data is output as a downstream message data 50 to the second data processing unit 12. Furthermore, the first data processing unit 11 generates reception acknowledgment data 57 to be sent to the terminal device 2-1 and adds a header 56 designating the terminal device 2-1 as the destination and error detection/correction data 58 to reception acknowledgment data 57. The first data processing unit 11 outputs the resultant data to the second data processing unit 12.

The second data processing unit 12 stores the message data transmitted by the terminal device 2-1 as downstream message data into the message memory M1. Furthermore, the second data processing unit 12 stores the reception acknowledgment data 55 received from the first data processing unit 11, that is to be sent to the terminal device 2-1, into the reception acknowledgment memory M2. The third data processing unit 13 reads the downstream transmission data 50 stored in the message memory M1 and outputs it to the transmission device 15.

If the reception acknowledgment memory M2 and the transmission acknowledgment memory M3 includes reception acknowledgment data or transmission acknowledgment data, the third data processing unit 13 reads a predetermined number of reception acknowledgment data or transmission acknowledgment data, and adds the data to the downstream message data. The resultant data is output as a downstream transmission data to the transmission device 15 (refer to FIG. 5). The downstream transmission data is transmitted as a large-zone downstream signal from the transmission device 15 toward the terminal devices 2-1 to 2-m.

If the terminal device 2-2 receives the message data transmitted by the terminal device 2-1, the receiver 23 demodulates the received data and the demodulated message data is displayed on the display device of the data processor/display/operating panel 24. On the other hand, when the terminal device 2-1 receives the reception acknowledgment data from the base station 1, a message informing the user that the message transmitted from the terminal device 2-1 has been correctly received by the base station 1 is displayed on the display device of the terminal device 2-1.

When the user of the terminal device 2-2 reads the message from the terminal device 2-1, if he/she presses the reception acknowledgment button of the data processor/display/operating panel 24 to send reception acknowledgment data to the terminal device 2-1, the data processor/display/operating panel 24 of the terminal device 2-2 puts the prestored reception acknowledgment data into the information filed 62 and adds a header 61 designating the address of the terminal device 2-1 as the destination address (refer to FIG. 4) and a frame test field 63. The resultant data is output as upstream transmission data to the duplexer unit 22. The duplexer unit 22 transmits the received data as a small-zone upstream signal according to the CSMA/CD technique to the relay station 3.

If the receiver 32 of the relay station 3 receives the small-zone upstream signal (reception acknowledgment data) transmitted from the terminal device 2-2, the data processor/memory 33 performs an error detection/correction process on the received data and stores the resultant data into the memory. When the amount of the data stored in the memory reaches a predetermined value, a predetermined number of transmission data 60 (four transmission data, in this specific example) are compressed, and a header 71 and error detection/correction data 72 are added (refer to FIG. 5). The resultant compressed data 70 is transmitted to the base station 1.

If the base station 1 receives the above-described data from the relay station 3, the first data processing unit 11 decompresses the data and performs an error detection/ correction process on the data. If there is duplicated data, it is removed. According to the destination address and the sender address described in the header 50 of the received reception acknowledgment data, the reception acknowledgment data is output to the second data processing unit 12 and stored in the reception acknowledgment memory M2.

When the third data processing unit 13 reads the message data from the message memory M1 and transmits it, the reception acknowledgment data received from the terminal device 2-2 and stored in the reception acknowledgment memory M2 is read from the reception acknowledgment memory M2 and added to the message data. The resultant data is transmitted as a large-zone downstream signal. The large-zone downstream signal is demodulated by the receiver 23 of the terminal device 2-1 and thus the reception acknowledgment data transmitted by the terminal device 2-2 is displayed on the display device of the data processor/ display/operating panel 24.

As described above, in the case where a message is sent from a certain terminal device to another terminal device, when the message is correctly received by base station 1, reception acknowledgment data generated by the base station 1 is displayed on the monitor of the terminal device at the sending end. Furthermore, when the user of the terminal device at the receiving end acknowledges the message, reception acknowledgment data generated by the terminal device at the receiving end is displayed on the monitor of the terminal device at the sending end.

3. Transmission of a Message from a Terminal Device to a Subscriber's Personal Computer The operation of transmitting a message from the terminal device 2-1 to the subscriber's personal computer 5 is described below. If the user of the terminal device 2-1 inputs a message addressed to the subscriber's personal computer 5 via the data processor/display/operating panel 24 and issues a transmission start command, then the data processor/display/operating panel 24 puts the input message data into the information field 62. Furthermore, the data processor/display/operating panel 24 adds a header 61 designating the address of the subscriber's personal computer 5 as the destination address (refer to FIG. 3) and a frame test field 63 to the message data. The resultant data is transmitted as a small-zone upstream signal to the relay station 3 via the duplexer unit 22.

When relay station 3 receives the small-zone upstream signal transmitted from the terminal device 2-1, the receiver 32 demodulates the received signal and the data processor/ memory unit 33 performs an error detection/correction process on the demodulated signal. The resultant data is stored in the memory. When the amount of the upstream transmission data stored in the memory of the data processor/ memory unit 33 reaches a predetermined value, a predetermined number of upstream transmission data are compressed, and a header 71 and error detection/correction data 72 shown in FIG. 5 are added. The resultant data is then transmitted as compressed data 70 to the base station 1.

If the base station 1 receives the above-described compressed data 70, the first data processing unit 11 decompresses the data and performs an error detection/correction process on the data. If there is duplicated data, it is removed. After completion of the above process, the first data processing unit 11 detects the destination address and the sender address described the header 61 of the upstream transmission data 60 transmitted by the terminal device 2-1.

In this specific example, the address of the subscriber's personal computer 5 is designated as the destination address of the data transmitted from the terminal device 2-1, and thus the first data processing unit 11 outputs the received message data to the line interface unit 14. The first data processing unit 11 also generates reception acknowledgment data addressed to the terminal device 2-1 and outputs it to the second data processing unit 12. This reception acknowledgment data is stored in the reception acknowledgment memory M2 of the second data processing unit 12 and is read by the third data processing unit 13 at the time when the third data processing unit 13 reads the downstream signal data from the message memory M1. The reception acknowledgment data read from the reception acknowledgment memory M2 is added to the downstream signal data and the resultant data is transmitted to the terminal device 2-1.

If the terminal device 2-1 receives this reception acknowledgment data, a message informing the user that the message transmitted by the terminal device 2-1 to the subscriber's terminal computer 5 has been correctly received by the base station 1 is displayed on the display device of the data processor/display/operating panel 24.

In the base station 1, the line interface unit 14 transfers the message data from the terminal device 2-1 to the subscriber's personal computer 5 via the cable line 6, the Internet provider 7, and the Internet network 4. Thus, the message from the terminal device 2-1 is displayed on the monitor of the subscriber's personal computer 5.

When the message is transmitted from the base station 1 to the subscriber's personal computer 5, the first data processing unit 11 generates transmission acknowledgment data and adds a header designating the address of the terminal device 2-1 as the destination address. The resultant data is output to the second data processing unit 12. This transmission acknowledgment data is stored in the transmission acknowledgment memory M3 of the second data processing unit 12 and is read by the third data processing unit 13 at the time when the third data processing unit 13 reads the downstream transmission data from the message memory M1. The reception acknowledgment data read from the reception acknowledgment memory M2 is added to the downstream signal data and the resultant data is transmitted to the terminal devices 2-1 to 2-m.

When the terminal device 2-1 receives the above-described reception acknowledgment data, the receiver 32 demodulates the received data and a message informing the user that the message has been transmitted from the base station 1 to the subscriber's terminal computer 5 is displayed on the display device of the data processor/display/operating panel 24.

As described above, in the case where a message addressed to a subscriber is sent from a terminal device, when the message is received by the base station 1 via the relay station 3, a reception acknowledgment message is displayed on the display device of the sender's terminal device. Furthermore, when the message is transmitted to the subscriber, a transmission acknowledgment message is displayed on the display device of the sender's terminal device.

Although in the two-way radio communication system, the data transmission from the relay stations 3-1 to 3-m and the subscriber's personal computer 5 to the base station 1 is performed via the Internet network 4, a private-line or a public telephone line may also be employed.

Furthermore, the functions provided by the first data processing unit 11, the second data processing unit 12, and the third data processing unit 13 in the center device 10 shown in FIG. 2 may also be implemented by loading a reception checking and acknowledging program stored on a computer-readable storage medium (such as a floppy disk, a CD-ROM, a magneto-optical disk, an IC card, or a DVD-ROM) into a computer and executing the reception checking and acknowledging program on the computer.

Herein, the term "storage medium" is used to describe not only such types of storage media on which a program is stored in static fashion, but also a wide variety of storage media. They include storage media on which a program is dynamically held for a short time for example a communication line such as a private Internet line or a telephone line via which a program is supplied, and storage media on which a program is stored for a predetermined fixed time as is the case with a server or a computer from which a program is supplied.

As can be understood from the above description, the present invention has the advantage that in a two-way radio communication system in which information is transmitted in both directions, a base station reception acknowledgment information indicating that information sent from a certain radio communication terminal device has been correctly received by a base station is transmitted in such a manner that the base station reception acknowledgment information is added to information to be transmitted toward a plurality of radio communication terminal devices and the resultant information is transmitted toward the plurality of radio communication terminal devices thereby allowing the base station reception acknowledgment information to be transmitted to the radio communication terminal device without causing a reduction in the efficiency of transmitting downstream signals. That is, it is possible to transmit a reception acknowledgment signal without causing a reduction in the processing efficiency of transmitting messages to called terminal devices.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application Nos. Hei 09-271653, filed Oct. 3, 1997, and Hei 10-248832 filed on Sep. 2, 1998, the contents of both of which are incorporated herein by reference.

What is claimed as new and desired to be secured by Letters Patent of the United States is:

1. A method of checking and acknowledging reception of information in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, wherein, in the process of transferring the information from the radio communication terminal device at the sending end to the radio communication terminal device at the destination, reception of the information originating from the radio communication terminal device at the sending end is checked and data indicating the result is sent to the radio communication terminal device at the sending end, and wherein said base station is adapted to operate in such a manner that:

when said base station correctly receives information sent from a radio communication terminal device at the sending end via the relay station and transmission line, said base station generates base station reception acknowledgment information indicating that said information has been correctly received; and when said base station transmits the information addressed to any of said plurality of radio communication terminals devices toward said plurality of radio communication terminal devices, said base station adds to said information said base station reception acknowledgment information addressed to the radio communication terminal device at said sending end and transmits the resultant information.

2. The method according to claim 1, wherein said two-way radio communication system includes a plurality of transmission line communication terminal devices that are connected to said transmission line so that said transmission line communication terminal devices may transmit and receive information to and from said plurality of radio communication terminal devices via said base station, and wherein said base station is adapted to operate in such a manner that:

if said base station receives information that originates from any of said plurality of radio communication terminal devices and that is addressed to any of said plurality of transmission line communication terminal devices, said base station transmits said information via said transmission line to the transmission line communication terminal device designated as the destination of said information;

if said base station correctly receives information that originates from a radio communication terminal device at a sending end via said relay station and transmission line and that is addressed to any of said plurality of radio communication terminal devices or any of said plurality of transmission line communication terminal devices, said base station generates base station reception acknowledgment information indicating that said information has been correctly received; and when said base station transmits the information addressed to any of said plurality of radio communication terminal devices toward said plurality of radio communication terminal devices, said base station adds to said information said base station reception acknowledgment information addressed to the radio communication terminal device at said sending end and transmits the resultant information.

3. The method according to claim 2, wherein:

said plurality of radio communication terminal devices are adapted to operate in such a manner that when any of said plurality of radio communication terminal device receives information addressed to that radio communication terminal device, said radio communication terminal device generates terminal device reception acknowledgment information addressed to a radio communication terminal device or a transmission line communication terminal device that is the original sender of said information, and transmits said terminal device reception acknowledgment information to the relay station;

said base station is adapted to operate in such a manner that when said base station receives said terminal device reception acknowledgment information via said relay station and transmission line, if said terminal device reception acknowledgment information is addressed to any of said plurality of radio communication terminal devices, then said base station adds said terminal device reception acknowledgment information to said information when said base stations transmits said information addressed to said any of the plurality of radio communication terminal devices toward said plurality of radio communication terminal devices, if said terminal device reception acknowledgment information is addressed to a transmission line communication terminal device, then said base station transmits said terminal device reception acknowledgment information via the transmission line to the transmission line communication terminal device that is the original sender of said information.

4. The method according to claim 3, wherein said base station is adapted to operate in such a manner that:

when said base station transmits information, that originates from any of said plurality of radio communication terminal devices and that is addressed to any of said radio communication terminal device or any of said transmission line communication terminal devices, to the plurality of radio communication terminal devices or transmission line communication terminal devices, said base station generates transmission acknowledgment information which will be sent to the radio communication terminal device that is the original sender of said information so as to inform that said information has been correctly transmitted from said base station; and when said base station transmits the information addressed to any of said plurality of radio communication terminal devices toward the plurality of radio communication terminal devices, said base station adds said transmission acknowledgment information to said information and transmits the resultant information.

5. The method according to claim 4, wherein said base station is further adapted to operate in such a manner that:

said base station stores the information addressed to a radio communication terminal device or a transmission line communication terminal device, said terminal device reception acknowledgment information and base station reception acknowledgment information, and said transmission acknowledgment information, separately from each other, whenever such information is received; and when said base station transmits the stored information addressed to a radio communication terminal device, said base station adds at least one piece of stored terminal device reception acknowledgment information or one piece of base station reception acknowledgment information or one piece of transmission acknowledgment information to said information and transmits the resultant information.

6. A two-way radio communication system including:

a base station that transmits information received via a transmission line, as a downstream signal;

a plurality of radio communication terminal devices that receive information addressed to themselves via the downstream signal and that also transmit information generated by themselves as an upstream signal; and a plurality of relay stations that receive an upstream signal transmitted from the radio communication terminal devices and transmit the information included in said upstream signal to said base station via the transmission line, whereby said plurality of radio communication terminal devices transmit and receive information to and from one another via the base station and the relay station;

said base station including:

base station reception acknowledgment information generating means adapted to operate in such a manner that when said base station correctly receives information originating from a radio communication terminal device via the relay station and transmission line, said base station reception acknowledgment information generating means generates base station reception acknowledgment information indicating that said information has been correctly received; and base station reception acknowledgment information adding means adapted to operate in such a manner that when said base station transmits the information addressed to any of said plurality of radio communication terminal devices toward said plurality of radio communication terminal devices;

wherein said base station reception acknowledgment information adding means adds to said information said base station reception acknowledgment information addressed to the radio communication terminal device that is the original sender of said information.

7. The system according to claim 6, further comprising a plurality of transmission line communication terminal devices that are connected to said transmission line so that said transmission line communication terminal devices may transmit and receive information to and from said plurality of radio communication terminal devices via said transmission line and said base station;

wherein said base station includes transmission line transmitting means adapted to operate in such a manner that if said base station receives information that originates from any of said plurality of radio communication terminal devices and that is addressed to any of said plurality of transmission line communication terminal devices, said transmission line transmitting means transmits said information via said transmission line to the transmission line communication terminal device designated as the destination of said information; and wherein if said base station correctly receives information that originates from a radio communication terminal device at a sending end via said relay station and transmission line and that is addressed to any of said plurality of radio communication terminal devices or any of said plurality of transmission line communication terminal devices, said base station reception acknowledgment information generating means generates base station reception acknowledgment information indicating that said information has been correctly received.

8. The system according to claim 7, wherein each of said plurality of radio communication terminal devices comprises:

terminal device reception acknowledgment information generating means adapted to operate in such a manner that when any of said plurality of radio communication terminal device receives information addressed to that radio communication terminal device, said terminal device reception acknowledgment information generating means generates terminal device reception acknowledgment information addressed to a radio communication terminal device or a transmission line communication terminal device that is the original-sender of said information; and upstream signal transmitting means for transmitting said terminal device reception acknowledgment information as an upstream signal; and wherein said base station includes:

terminal device reception acknowledgment information adding means adapted to operate in such a manner that if the terminal device reception acknowledgment information received via said relay station and the transmission line is addressed to any of said plurality of radio communication terminal devices, said terminal device reception acknowledgment information adding means adds said terminal device reception acknowledgment information to said information when said information addressed to said any of the plurality of radio communication terminal devices is transmitted toward said plurality of radio communication terminal devices; and terminal device reception acknowledgment information transmitting means adapted to operate in such a manner that if said terminal device reception acknowledgment information is addressed to a transmission line communication terminal device, said terminal device reception acknowledgment information transmitting means transmits said terminal device reception acknowledgment information via the transmission line to the transmission line communication terminal device that is the original sender of said information.

9. The system according to claim 8, wherein said base station includes:

transmission acknowledgment information generating means adapted to operate in such a manner that when said base station transmits information, that originates from any of said plurality of radio communication terminal devices and that is addressed to any of said radio communication terminal device or any of said transmission line communication terminal devices, to the plurality of radio communication terminal devices or transmission line communication terminal devices, said transmission acknowledgment information generating means generates transmission acknowledgment information that will be sent to the radio communication terminal device that is the original sender of said information so as to inform that said information has been correctly transmitted from said base station; and transmission acknowledgment information adding means adapted to operate in such a manner that when said base station transmits the information addressed to any of said plurality of radio communication terminal devices toward the plurality of radio communication terminal devices, said transmission acknowledgment information adding means adds said transmission acknowledgment information to said information addressed to said any of said plurality of radio communication terminal devices.

10. The system according to claim 9, wherein said base station includes storage means for storing the information to be transmitted to said plurality of radio communication terminal device, said terminal device reception acknowledgment information and base station reception acknowledgment information, and said transmission acknowledgment information, separately from each other, whenever such information is received; and wherein when said base station transmits, as a downstream signal, the information stored in said storage means to said plurality of radio communication terminal devices, said base station reception acknowledgment information adding means, terminal device reception acknowledgment information adding means, and transmission acknowledgment information adding means read at least one piece of terminal device reception acknowledgment information and one piece of base station reception acknowledgment information, and one piece of transmission acknowledgment information, from said storage means and add them to said information.

11. A two-way radio communication system comprising:

a base station that transmits information received via a transmission line, as a downstream signal;

a plurality of radio communication terminal devices that receive information addressed to themselves via the downstream signal and that also transmit information generated by themselves as an upstream signal; and a plurality of relay stations that receive an upstream signal transmitted from the radio communication terminal devices and transmit the information included in said upstream signal to said base station via the transmission line, whereby said plurality of radio communication terminal devices transmit and receive information to and from one another via the base station and the relay station;

said base station including:

a base station data processing unit adapted to operate in such a manner that when said base station correctly receives information originating from a radio communication terminal device via the relay station and transmission line, said base station data processing unit generates base station reception acknowledgment information indicating that said information has been correctly received; and a data adding unit adapted to operate in such a manner that when said base station transmits the information addressed to any of said plurality of radio communication terminal devices toward said plurality of radio communication terminal devices, said data adding unit adds to said information said base station reception acknowledgment information addressed to the radio communication terminal device from which said information originates.

12. The system according to claim 11, further comprising a plurality of transmission line communication terminal devices that are connected to said transmission line so that said transmission line communication terminal devices may transmit and receive information to and from said plurality of radio communication terminal devices via said transmission line and said base station;

wherein said base station includes a transmission line transmitter adapted to operate in such a manner that if said base station receives information that originates from any of said plurality of radio communication terminal devices and that is addressed to any of said plurality of transmission line communication terminal devices, then said transmission line transmitter transmits said information via said transmission line to the transmission line communication terminal device designated as the destination of said information; and wherein if said base station correctly receives information that originates from a radio communication terminal device at a sending end via said relay station and transmission line and that is addressed to any of said plurality of radio communication terminal devices or any of said plurality of transmission line communication terminal devices, said base station data processing unit generates base station reception acknowledgment information indicating that said information has been correctly received.

13. The system according to claim 12, wherein each of said plurality of radio communication terminal devices comprises:

a terminal data generator adapted to in such a manner that when any of said plurality of radio communication terminal device receives information addressed to that radio communication terminal device, said terminal data generator generates terminal device reception acknowledgment information addressed to a radio communication terminal device or a transmission line communication terminal device that is the original sender of said information; and upstream signal transmitter for transmitting said terminal device reception acknowledgment information as an upstream signal; and wherein said base station data processing unit of said base station is adapted to operate in such a manner that:

said base station data processing unit determines whether the terminal device reception acknowledgment information received via said relay station and the transmission line is addressed to a radio communication terminal device or a transmission line communication terminal device; and if said base station data processing unit determines that said terminal device reception acknowledgment information is addressed to a transmission line communication terminal device, said base station data processing unit transmits said terminal device reception acknowledgment information to said transmission line communication terminal device; and if said base station data processing unit determines that said terminal device reception acknowledgment information is addressed to a radio communication terminal device, when the information addressed to any of said plurality of radio communication terminal devices is transmitted toward said plurality of radio communication terminal devices, said base station data processing unit adds said terminal device reception acknowledgment information to said information.

14. The system according to claim 13, wherein:

said base station data processing unit of said base station is adapted to operate in such a manner that when said base station transmits information, that originates from any of said plurality of radio communication terminal devices and that is addressed to any of said radio communication terminal device or any of said transmission line communication terminal devices, to the plurality of radio communication terminal devices or transmission line communication terminal devices, said base station data processing unit generates transmission acknowledgment information that will be sent to the radio communication terminal device that is the original sender of said information so as to inform that said information has been correctly transmitted from said base station; and said data adding unit is adapted to operate in such a manner that when said base station transmits the information addressed to any of said plurality of radio communication terminal devices toward said plurality of radio communication terminal devices, said data adding unit adds said base station reception acknowledgment information to said information.

15. The system according to claim 14, wherein:

said base station includes memories for storing the information to be transmitted to said plurality of radio communication terminal device, said terminal device reception acknowledgment information and base station reception acknowledgment information, and said transmission acknowledgment information, respectively, whenever such information is received; and said data adding unit is adapted to operate in such a manner that when said base station transmits, as a downstream signal, the information stored in said memories to said plurality of radio communication terminal devices, said data adding unit reads at least one piece of terminal device reception acknowledgment information and one piece of base station reception acknowledgment information, and one piece of transmission acknowledgment information, from said memories and adds them to said information.

16. The system according to any of claims 6 to 15, wherein said transmission line is the Internet.

17. A base station for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, said base station including:

base station reception acknowledgment information generating means adapted to operate in such a manner that when said base station correctly receives information originating from a radio communication terminal device via the relay station and transmission line, said base station reception acknowledgment information generating means generates base station reception acknowledgment information indicating that said information has been correctly received;

base station reception acknowledgment information adding means adapted to operate in such a manner that when said base station transmits the information addressed to any of said plurality of radio communication terminal devices toward said plurality of radio communication terminal devices, said base station reception acknowledgment information adding means adds to said information said base station reception acknowledgment information addressed to the radio communication terminal device that is the original sender of said information; and transmission means for transmitting the information addressed to any of said plurality of radio communication terminal devices and said base station reception acknowledgment information added to said information toward said plurality of radio communication terminal devices.

18. The base station according to claim 17, further including transmission line transmitting means adapted to operate in such a manner that if said base station receives information that originates from any of said plurality of radio communication terminal devices and that is addressed to any of a plurality of transmission line communication terminal devices connected to said transmission line, said transmission line transmitting means transmits said information via said transmission line to the transmission line communication terminal device designated as the destination of said information, wherein if said base station correctly receives information that originates from a radio communication terminal device at a sending end via said relay station and transmission line and that is addressed to any of said plurality of radio communication terminal devices or any of said plurality of transmission line communication terminal devices, said base station reception acknowledgment information generating means generates base station reception acknowledgment information indicating that said information has been correctly received.

19. The base station according to claim 18, further including:

terminal device reception acknowledgment information adding means adapted to operate in such a manner that when said base station receives terminal device reception acknowledgment information from any of said plurality of radio communication terminal devices via said relay station and said transmission line, said terminal device reception acknowledgment information indicating that said radio communication terminal device has correctly received information, if said terminal device reception acknowledgment information is addressed to any of said plurality of radio communication terminal devices, said terminal device reception acknowledgment information adding means adds said terminal device reception acknowledgment information to information addressed to any of said plurality of radio communication terminal devices when said transmission means transmits said information addressed to said any of the plurality of radio communication terminal devices toward said plurality of radio communication terminal devices; and transmission line transmission controlling means adapted to operate in such a manner that when said terminal device reception acknowledgment information is addressed to a transmission line communication terminal device, said transmission line transmission controlling means controls said transmission line transmitting means to transmit said terminal device reception acknowledgment information to the transmission line communication terminal device that is the original sender of said information.

20. The base station according to claim 19, further including:

transmission acknowledgment information generating means adapted to operate in such a manner that when said transmission means or said transmission line transmitting means transmits information, that originates from any of said plurality of radio communication terminal devices and that is addressed to any of said radio communication terminal device or any of said transmission line communication terminal devices, to the plurality of radio communication terminal devices or transmission line communication terminal devices, said transmission acknowledgment information generating means generates transmission acknowledgment information that will be sent to the radio communication terminal device that is the original sender of said information so as to inform that said information has been correctly transmitted from said base station; and transmission acknowledgment information adding means adapted to operate in such a manner that when said base station transmits the information addressed to any of said plurality of radio communication terminal devices toward the plurality of radio communication terminal devices, said transmission acknowledgment information adding means adds said transmission acknowledgment information to said information addressed to said any of said plurality of radio communication terminal devices.

21. The base station according to claim 19, further including storage means for storing the information to be transmitted to said plurality of radio communication terminal device, said terminal device reception acknowledgment information and base station reception acknowledgment information, and said transmission acknowledgment information, separately from each other, whenever such information is received;

wherein when said base station transmits the information stored in said storage means to said plurality of radio communication terminal devices, said base station reception acknowledgment information adding means, terminal device reception acknowledgment information adding means, and transmission acknowledgment information adding means read at least one piece of terminal device reception acknowledgment information and one piece of base station reception acknowledgment information, and one piece of transmission acknowledgment information from said storage means and add them to said information.

22. A base station for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, said base station including:
a data processing unit adapted to operate in such a manner that when said base station correctly receives information originating from a radio communication terminal device via the relay station and transmission line, said data processing unit generates base station reception acknowledgment information indicating that said information has been correctly received;
a data adding unit adapted to operate in such a manner that when said base station transmits the information addressed to any of said plurality of radio communication terminal devices toward said plurality of radio communication terminal devices, said data adding unit adds to said information said base station reception acknowledgment information addressed to the radio communication terminal device that is the original sender of said information; and
a transmitter for transmitting the information addressed to any of said plurality of radio communication terminal devices and said base station reception acknowledgment information added to said information toward said plurality of radio communication terminal devices.

23. The base station according to claim 22, further including a transmission line transmitter adapted to operate in such a manner that if said base station receives information that originates from any of said plurality of radio communication terminal devices and that is addressed to any of a plurality of transmission line communication terminal devices connected to said transmission line, said transmission line transmitter transmits said information via said transmission line to the transmission line communication terminal device designated as the destination of said information;
wherein if said base station correctly receives information that originates from a radio communication terminal device at a sending end via said relay station and transmission line and that is addressed to any of said plurality of radio communication terminal devices or any of said plurality of transmission line communication terminal devices, said data processing unit generates base station reception acknowledgment information indicating that said information has been correctly received.

24. The base station according to claim 23, wherein said data processing unit is adapted to operate in such a manner that:
when said base station receives terminal device reception acknowledgment information from any of said plurality of radio communication terminal devices via said relay station and said transmission line, said terminal device reception acknowledgment information indicating that said radio communication terminal device has correctly received information, said data processing unit determines whether said terminal device reception acknowledgment information is addressed to a radio communication terminal device or a transmission line communication terminal device; and
if data processing unit determines that said terminal device reception acknowledgment information is addressed to a transmission line communication terminal device, said data processing unit outputs said terminal device reception acknowledgment information to said transmission line transmitter so that said transmission line transmitter transmits said terminal device reception acknowledgment information to said transmission line communication terminal device that is the original sender of the information; and
if data processing unit determines that said terminal device reception acknowledgment information is addressed to a radio communication terminal device, when the information addressed to any of said plurality of radio communication terminal devices is transmitted toward said plurality of radio communication terminal devices, said data adding unit adds said terminal device reception acknowledgment information to said information.

25. The base station according to claim 24, wherein said data processing unit is adapted to operate in such a manner that when said transmitter or said transmission line transmitter transmits information, that originates from any of said plurality of radio communication terminal devices and that is addressed to any of said radio communication terminal device or any of said transmission line communication terminal devices, to the plurality of radio communication terminal devices or transmission line communication terminal devices, said data processing unit generates transmission acknowledgment information which will be sent to the radio communication terminal device that is the original sender of said information so as to inform that said information has been correctly transmitted from said base station; and
said data adding unit is adapted to operate in such a manner that when said base station transmits the information addressed to any of said plurality of radio communication terminal devices toward said plurality of radio communication terminal devices, said data adding unit adds said base station reception acknowledgment information to said information.

26. The base station according to claim 25, further including memories for storing the information to be transmitted to said plurality of radio communication terminal device, said terminal device reception acknowledgment information and base station reception acknowledgment information, and said transmission acknowledgment information, respectively, whenever such information is received;
wherein said data adding unit is adapted to operate in such a manner that when said base station transmits the information stored in said memories to said plurality of radio communication terminal devices, said data adding unit reads at least one piece of terminal device reception acknowledgment information and one piece of base station reception acknowledgment information, and one piece of transmission acknowledgment information, from respective said memories and adds them to said information.

27. A computer-readable storage medium on which reception checking and acknowledging program is stored, for use in a two-way radio communication system in which information sent from a radio communication terminal device at a sending end is received by a relay station, the received information is transferred to a base station via a transmission line, and the information originating from the radio communication terminal device at the sending end is further transferred from the base station to a radio communication terminal device designated as the destination of the information thereby allowing a plurality of radio communication terminal devices to transmit and receive information to and from each other, wherein, in the process of transferring the information from the radio communication terminal device at the sending end to the radio communication terminal device at the destination, said reception checking and acknowledging program checks whether the information originating from the radio communication terminal device at the sending end has been correctly received and transmits data indicating the result to the radio communication terminal device at the sending end, said reception checking and acknowledging program comprising:

- a first step in which when said base station correctly receives information sent from a radio communication terminal device at the sending end via the relay station and transmission line, base station reception acknowledgment information indicating that said information has been correctly received is generated in said base station; and
- a second step in which when the information addressed to any of said plurality of radio communication terminal devices is transmitted from said base station toward said plurality of radio communication terminal devices, said base station reception acknowledgment information addressed to the radio communication terminal device at said sending end is added to said information and the resultant information is transmitted.

28. The computer-readable storage medium on which reception checking and acknowledging program according to claim 27 is stored, wherein said two-way radio communication system includes a plurality of transmission line communication terminal devices that are connected to said transmission line so that said transmission line communication terminal devices may transmit and receive information to and from said plurality of radio communication terminal devices via said base station, said reception checking and acknowledging program further comprising:

- a third step in which if information that originates from any of said plurality of radio communication terminal devices and that is addressed to any of said plurality of transmission line communication terminal devices is received by said base station, said information is transmitted via said transmission line to the transmission line communication terminal device designated as the destination of said information;
- a fourth step in which if information that originates from a radio communication terminal device at a sending end via said relay station and transmission line and that is addressed to any of said plurality of radio communication terminal devices or any of said plurality of transmission line communication terminal devices is correctly received by said base station, base station reception acknowledgment information indicating that said information has been correctly received is generated; and
- a fifth step in which when the information addressed to any of said plurality of radio communication terminal devices is transmitted from said base station toward said plurality of radio communication terminal devices, said base station reception acknowledgment information addressed to the radio communication terminal device at said sending end is added to said information and the resultant information is transmitted.

29. The computer-readable storage medium on which reception checking and acknowledging program according to claim 28 is stored, wherein said reception checking and acknowledging program further comprises:

- a sixth step in which when terminal device reception acknowledgment information is received from any of said plurality of radio communication terminal devices via said relay station and said transmission line, said terminal device reception acknowledgment information indicating that said radio communication terminal device has correctly received information, if said terminal device reception acknowledgment information is addressed to any of said plurality of radio communication terminal devices, when said information addressed to said any of the plurality of radio communication terminal devices is transmitted from said base station toward said plurality of radio communication terminal devices, said terminal device reception acknowledgment information is added to said information and the resultant information is transmitted; and
- a seventh step in which if said terminal device reception acknowledgment information is addressed to a transmission line communication terminal device, said terminal device reception acknowledgment information is transmitted via said transmission line to the transmission line communication terminal device that is the original sender of said information.

30. The computer-readable storage medium on which reception checking and acknowledging program according to claim 29 is stored, wherein said reception checking and acknowledging program further comprises:

- an eighth step in which when information that originates from any of said plurality of radio communication terminal devices and that is addressed to any of said radio communication terminal device or any of said transmission line communication terminal devices is transmitted from said base station to the plurality of radio communication terminal devices or transmission line communication terminal devices, transmission acknowledgment information is generated which will be sent to the radio communication terminal device that is the original sender of said information so as to inform that said information has been correctly transmitted from said base station; and
- a ninth step in which when the information addressed to any of said plurality of radio communication terminal devices is transmitted toward the plurality of radio communication terminal devices, said transmission acknowledgment information is added to said information and the resultant information is transmitted.

31. The computer-readable storage medium on which reception checking and acknowledging program according to claim 30 is stored, wherein said reception checking and acknowledging program further comprises:

- a tenth step in which the information addressed to a radio communication terminal device or a transmission line communication terminal device, said terminal device reception acknowledgment information and base station reception acknowledgment information, and said transmission acknowledgment information are stored separately from each other whenever such information is received by said base station; and
- an eleventh step in which when the stored information addressed to a radio communication terminal device is transmitted from said base station, at least one piece of stored terminal device reception acknowledgment information or one piece of base station reception acknowledgment information or one piece of transmission acknowledgment information is added to said information and the resultant information is transmitted.

* * * * *